May 10, 1932.　　　W. R. COPPAGE　　　1,857,529
CONVEYER CHAIN
Filed March 23, 1931　　2 Sheets-Sheet 2
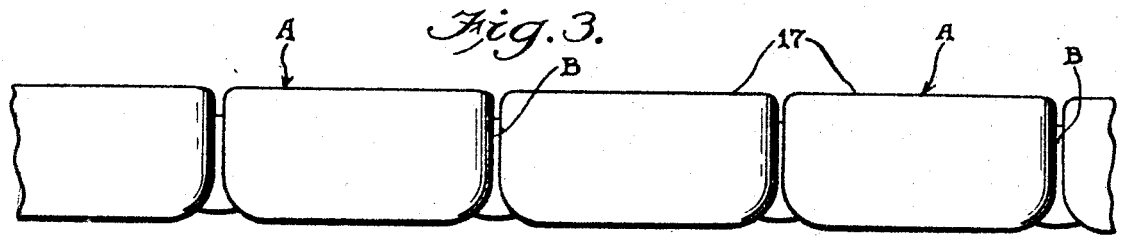
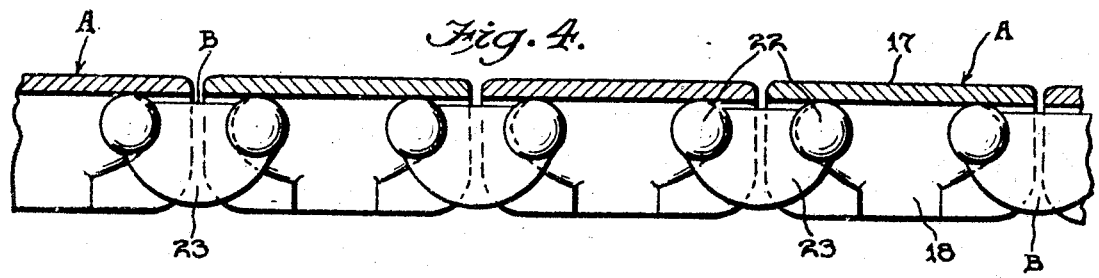
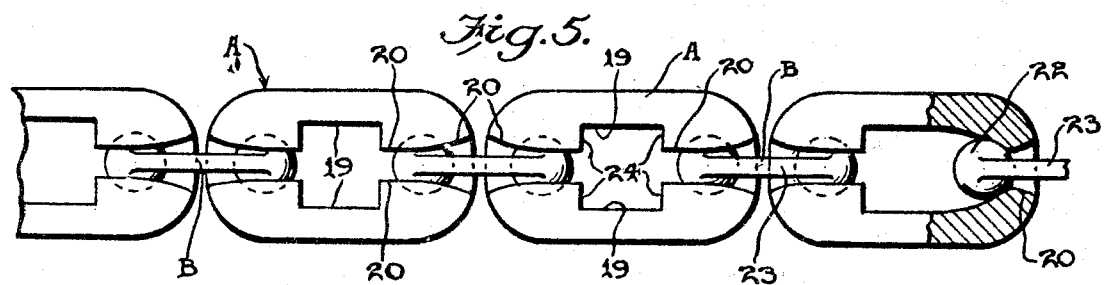
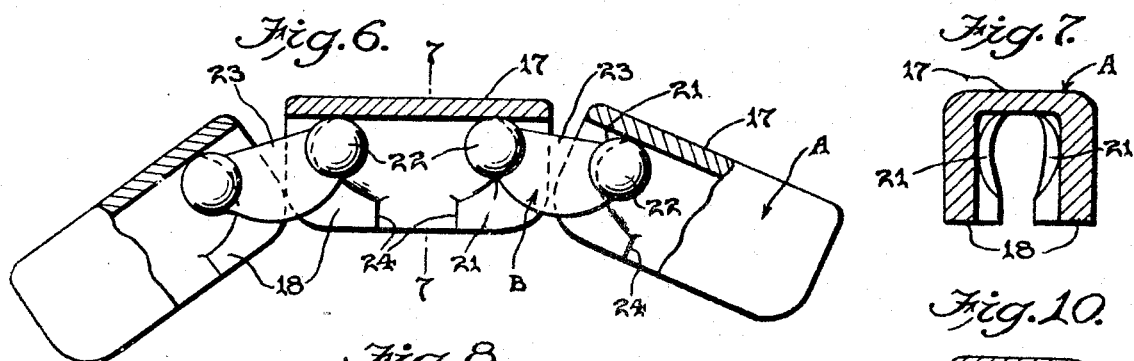
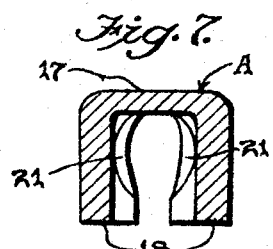
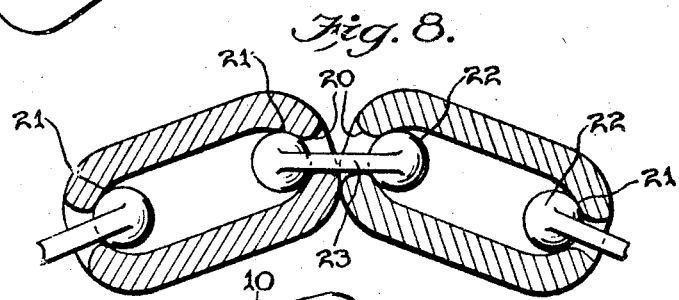
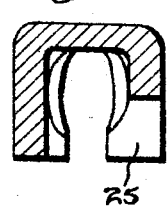
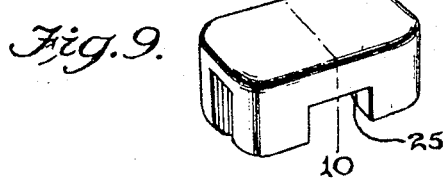

Patented May 10, 1932

1,857,529

UNITED STATES PATENT OFFICE

WILLIAM R. COPPAGE, OF CHERRYDALE, VIRGINIA

CONVEYER CHAIN

Application filed March 23, 1931. Serial No. 524,699.

This invention relates to improvements in conveyer chains.

The primary object of the invention is to provide a conveyer chain having readily detachable and interchangeable links, alternate ones of which have substantially plane surfaces, so that a box or the like supported thereby may be carried to a certain station, and then be halted by some obstructing means, without interfering with the continuous travel of the chain. Such a construction is especially advantageous in the handling of boxes of milk bottles within a dairy, for a box placed on the conveyer will be carried automatically to a desired station, and may then remain on the belt in an immovable position while the belt continues to travel beneath the box.

Another object is to furnish a conveyer of this character having links connected by universal joints to allow the chain to travel in various paths without interference by kinking of portions of the chain. The universal joints are of such construction however, that the links cannot revolve lengthwise of the chain.

With the foregoing objects outlined and with other objects in view which will appear as the description proceeds, the invention consists in the novel features hereinafter described in detail, illustrated in the accompanying drawings, and more particularly pointed out in the appended claims.

In the drawings,

Fig. 3 is an enlarged side elevation of a portion of one of the conveyer chains.

Fig. 4 is a longitudinal vertical sectional view of the same.

Fig. 5 is a bottom plan view of the same, partly in horizontal section.

Fig. 6 is a side elevation partly in longitudinal vertical section, of a portion of the chain, and illustrating the manner in which the links may pass around a sprocket wheel.

Fig. 7 is a vertical sectional view of one of the links on the line 7—7 of Fig. 6.

Fig. 8 is a horizontal sectional view of some of the links, and illustrating the manner in which the chain may pass around a corner or the like.

Fig. 9 is a perspective view of a modified form of link.

Fig. 10 is a sectional view of the same on the line 10—10 of Fig. 9.

Figure 1:
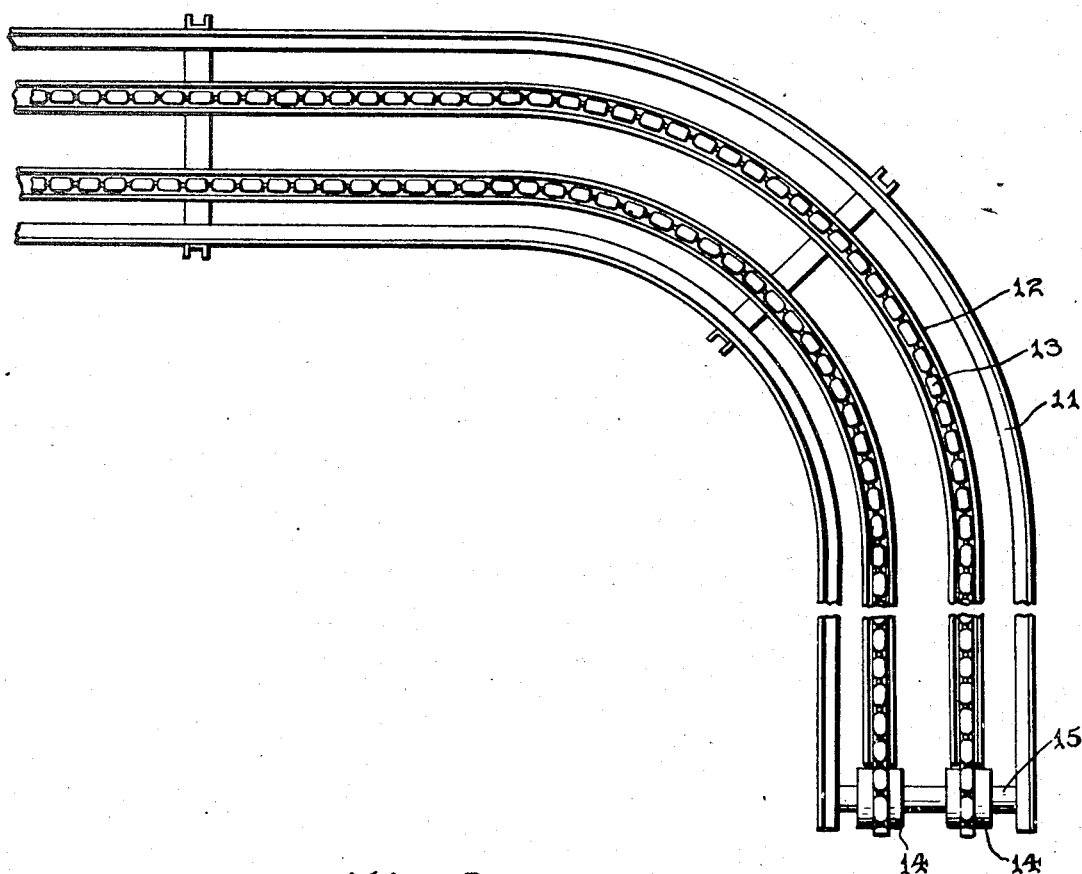
Fig. 1 is a top plan view of a portion of a conveyer in which the invention is incorporated.
Figure 2:
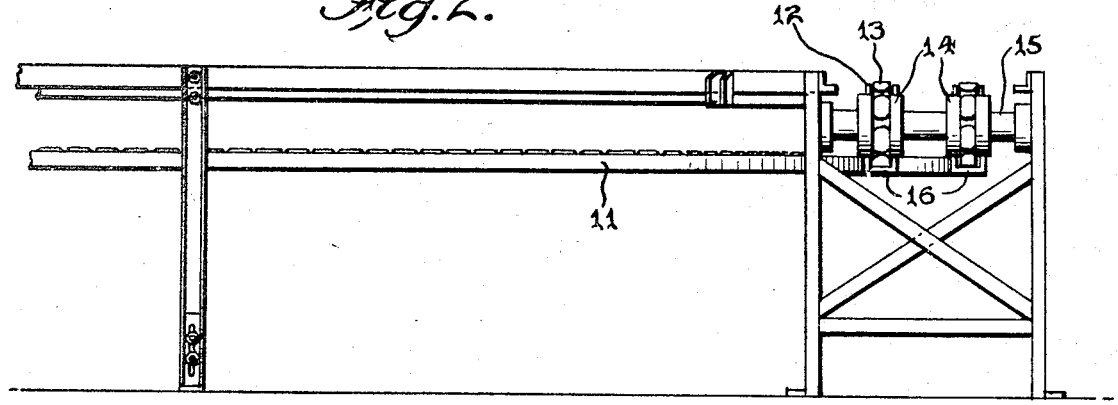
Fig. 2 is a front elevation of the same.

Referring to the drawings, 11 designates a conveyer frame having tracks 12 which guide conveyer chains 13. Owing to the special construction of my chain, the tracks 12 may extend uphill or down, and may turn corners, as indicated in Fig. 1. At the ends of the track, the chains engage sprocket wheels 14 mounted on shafts 15. Only one of these shafts and its sprocket wheels is illustrated, and it will be noted that either one of the shafts may be driven by any suitable prime mover for causing the travel of the chains. To prevent undue slack in the chains, lower tracks 16 are positioned immediately below the tracks 12 for the purpose of guiding the lower runs of the chains.

In accordance with my invention, each chain is made up of two types of links A and B, and each link A is of substantially channel shape lengthwise thereof, the bottom of the channel forming a plane surface 17. The walls 18 of the channel are spaced apart a greater distance at their medial portions, as indicated at 19, than at their end portions, as indicated at 20, and the extremities of the walls are spaced apart by flared mouths 21. The opposite walls of each channel form pockets 21 at the ends of the link, and these pockets form sockets to receive balls 22 forming the ends of the links B. A relatively narrow web 23 connects the balls of each of the links B, and extends through the flared mouths 20, and this provides universal joints so that the chain made up of such links may flex in various planes as indicated in Figs. 6 and 8.

In connecting a link B to a link A, the ball 22 is introduced into the channel of the link A between the medial portions 19 of the walls, and is brought into contact with the surface of the pocket 21, and at such time, the web 23 will project through the flared mouth 20 at that end of the link A. Now, a second link A may be connected to the other ball of the link B and so on, until an endless chain of the desired length is made. Obviously, this construction allows quick replacement of any one of the links.

The notches 19 not only provide a gateway for the entrance of the ball 22, but the end walls 24 of such notches form abutments for the engagement of the teeth of the sprocket wheel 14, and if desired, one wall of each channel may be notched as indicated at 25 in Figs. 9 and 10, for the reception of a tooth of the sprocket wheel.

When links of this character are used in the chains 13, it will be understood that their flat surfaces 17 come in engagement with the box that is to be conveyed, and after the box has travelled to a desired station, if an immovable obstruction is placed across the tracks 12, the box will halt without attention by an attendant, but the chains can continue to travel for the smooth surfaces 17 will simply slide underneath the box.

The links may be made of any suitable material, but I prefer to make them of metal.

It will be noted that each web 23 is flat and of substantially the same height as each of the links A, and the mouths 20 are so shaped as to co-operate with the webs 23 to prevent rotation of the links lengthwise of the chain.

While I have disclosed what I now consider to be a preferred embodiment of the invention in such manner that the same may be readily understood by those skilled in the art, I am aware that changes may be made in the details disclosed, without departing from the spirit of the invention, as expressed in the claims.

What I claim and desire to secure by Letters Patent is:

1. A conveyer chain comprising first and second links, each of the first links being of channel shape lengthwise and having side walls, said walls forming pockets in the end portions of each link, each of the second links including balls engaging a pair of pockets of adjacent first links, and a web joining the balls, the ends of the walls of each of the first links forming flaring mouths through which the webs extend, each of said webs and each mouth being shaped to prevent rotation of the links relatively to one another lengthwise of the chain.

2. A conveyer chain comprising first and second links, each of the first links being of channel shape lengthwise and having side walls, said walls forming pockets in the end portions of each link, each of the second links including balls engaging a pair of pockets of adjacent first links, and a web joining the balls, one of the side walls of each of the first links having a notch extending toward the bottom of the channel to provide a sprocket wheel tooth abutment.

3. A conveyer chain comprising first and second link, each of the first links being of channel shape lengthwise and having a flat web and opposite side walls, said walls forming curved pockets in the end portions of each link, the edges of the ends of the side walls forming flaring mouths, each of the second links including balls engaging a pair of pockets of adjacent first links, and a web joining the balls and extending through the flaring mouths of the last mentioned links, the last mentioned web being of materially less width than any of said mouths to permit relative turning movement of the links laterally, each of said last mentioned webs being of substantially the same height as each of the first links to prevent rotation of the links relatively to one another lengthwise of the chain.

In testimony whereof I have signed this specification.

WILLIAM R. COPPAGE.